United States Patent [19]
Kurakake

[11] Patent Number: 4,471,462
[45] Date of Patent: Sep. 11, 1984

[54] NUMERICAL CONTROLLER

[75] Inventor: Mitsuo Kurakake, Hino, Japan

[73] Assignee: Fanuc Limited, Tokyo, Japan

[21] Appl. No.: 380,750

[22] PCT Filed: Sep. 4, 1981

[86] PCT No.: PCT/JP81/00221
§ 371 Date: May 14, 1982
§ 102(e) Date: May 14, 1982

[87] PCT Pub. No.: WO82/01091
PCT Pub. Date: Apr. 1, 1982

[30] Foreign Application Priority Data
Sep. 17, 1980 [JP] Japan ................................. 55-129572

[51] Int. Cl.$^3$ ............................................. G05B 19/8
[52] U.S. Cl. ...................................... 364/900; 364/188
[58] Field of Search ............................... 364/900, 188

[56] References Cited
U.S. PATENT DOCUMENTS
4,139,888 2/1979 Salmon .............................. 364/188

Primary Examiner—Raulfe B. Zache
Attorney, Agent, or Firm—Staas & Halsey

[57] ABSTRACT

A numerical controller, which is equipped to perform sequence control of a heavy-current circuit for a machine tool, has an interface line to which both an NC system operator panel and an additional operator panel are attached. The additional operator panel is dedicated to the function of entering, debugging, and confirming the sequence control program. The interface line is connected via a buffer circuit to a main bus in the numerical controller. When the sequence program is debugged, only the additional operator is enabled and key information from the additional operator is read into a main processor in the numerical controller to carry out debugging of the sequence control program under the control of a debugging execution program. When the NC system operator panel is used, the additional operator panel is disabled, thus switching between the operator panels.

1 Claim, 1 Drawing Figure

NUMERICAL CONTROLLER

BACKGROUND OF THE INVENTION

The present invention relates to improvements in a numerical controller which is equipped to perform sequence control of a heavy-current circuit for a machine tool.

The function of carrying out the sequence control of a heavy-current circuit for a machine tool can be provided by a data processing unit of a numerical controller (which function will hereinafter be referred to as a PC function) to reduce the cost and the space requirements of an NC machine tool, and numerical controllers equipped with the PC function have recently become popular. In conventional equipment of this kind, however, since a PC programmer for entering into an NC system a PC program into the NC system in order to perform the PC function and for correcting and confirming the PC program is not provided in the NC system, an expensive and bulky PC programmer unit must be separately provided.

To avoid this, there has been recently proposed a numerical controller which performs the PC programmer function to permit debugging of the PC program or the like without using such a separately provided unit, but since it uses one control panel for operating both of the NC system and the PC programmer, it is likely to incur erroneous operation, and hence for a manipulation.

SUMMARY OF THE INVENTION

An object of the present invention is to improve manipulation by a numerical controller equipped with such a PC programmer function. According to the present invention, in a numerical controller which is equipped to perform the sequence control of a heavy-current circuit for a machine tool and to perform the PC programmer function of debugging or the like of a PC program for carrying out the sequence control function, an interface line, which permits the connection thereto of an operator panel exclusively for debugging or the like of the PC program in addition to an operator panel for the numerical controller, is connected via a buffer circuit to a main bus of a main processor.

BRIEF DESCRIPTION OF THE DRAWING

The accompanying drawing illustrates in block form the principal part of the equipment in accordance with an embodiment of the present invention.

DESCRIPTION OF THE PREFERRED EMBODIMENT

Figure 1:
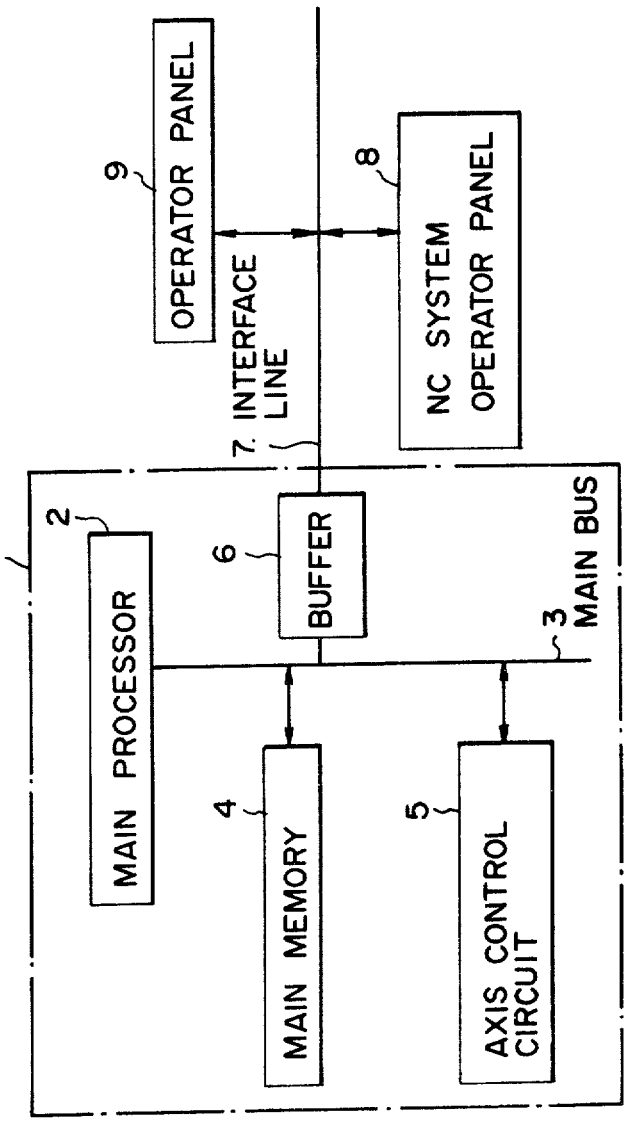

For a detailed description of the present invention, an embodiment will hereinafter be described in detail.

The accompanying drawing illustrates in block form the principal part of the equipment in accordance with an embodiment of the present invention. Reference numeral 1 indicates a numerical controller proper; 2 designates a main processor; 3 identifies the main bus of the processor; 4 denotes a main memory; 5 represents an axis control circuit; 6 shows a buffer circuit; 7 refers to an interface line provided with address, data and strobe buses; 8 signifies an operator panel for operating an NC system; and 9 indicates an operator panel for debugging or the like of a PC program. In the drawing, the main processor 2, as is well-known in the art, performs arithmetic processing of data stored in the main memory 4 under the control of an execution program stored in the memory 4 and provides the result of the processing to the axis control circuit 5, carrying out a predetermined numerical control operation.

In the equipment of this embodiment, as shown in the drawing, the interface line 7 permits the connection thereto of up to two operator panels and is connected via the buffer circuit 6 to the main bus 3. The operator panel 9, for debugging or the like of the PC program, is connected to the interface line 7, as is the operator panel 8 for the NC system. The operator panel 9 is identical with the NC system operator panel 8 in terms of hardware but it is produced so that the key arrangement and key information of its keyboard suit to the debugging and like operations. The buffer circuit 6 permits electrical connection of the main bus 3 and the interface line 7, and performs data transmission and reception between the main processor 2 and the NC system operator panel 8 and the operator panel 9.

In the above-described arrangement, when to debug the PC program stored in the main memory 4 or the like debugged, only the operator panel 9 is enabled key information from the operator panel 9 is read via the buffer circuit 6 into the main processor 2, and the PC program is debugged under the control of a debugging execution program stored in the main memory 4 or the like. When the NC system operator panel 8 is used, the operator panel 9 is disabled; thus, the operator panels are switched and this switching takes place through using an enable signal or the like.

As described in the above, according to the present invention, since an operator panel exclusively for debugging or the like of a PC program can be installed in addition to an operator panel for the numerical controller, operability is markedly enhanced as compared with the situation in which the same operator panel is used. In addition, since the both operator panels are connected to the same interface line, there is another advantage in that that standardization of the numerical controller proper is possible.

What I claim is:

1. An improved numerical controller of the type which is equipped to perform sequence control of a heavy-current circuit for a machine tool and to perform the PC programmer function of debugging or the like of a PC program for carrying out the sequence control function, said numerical controller including a main processor connected to a main bus, wherein the improvement comprises: an interface line, to which an operator panel exclusively for debugging or the like of the PC program can be connected in addition to an operator panel for operating the numerical controller, is connected via a buffer circuit to the main bus of the main processor.

* * * * *